UNITED STATES PATENT OFFICE.

CARL WILHELM BILDT, OF WORCESTER, MASSACHUSETTS.

LINING FOR BESSEMER CONVERTERS.

SPECIFICATION forming part of Letters Patent No. 484,286, dated October 11, 1892.

Application filed May 4, 1891. Serial No. 391,544. (No specimens.)

*To all whom it may concern:*

Be it known that I, CARL WILHELM BILDT, a subject of the King of Sweden and Norway, residing at Worcester, in the county of Worcester, State of Massachusetts, have invented certain new and useful Improvements in Linings for Bessemer Converters and Processes of Making the Same; and I do hereby declare that the following is a full, clear, and exact description thereof.

In Bessemer converters in which a lining of ganister or other acid material as heretofore made has been employed it has been found impossible to produce a steel very low in carbon on account of the reaction which occurs between the lining and the slag formed during a blow, as the slag becomes so acid as to make it ineffective to remove the last traces of carbon from the charge.

The object of my invention is to provide a lining for a converter which, while it is highly stable and refractory, will react so little upon the slag formed during a blow as to leave the slag sufficiently basic to remove the last traces of carbon from the charge.

My improvement consists in forming the lining of silicate of manganese. In forming such lining I prefer to make a mixture of very pure silica or quartz sand and burnt black oxide of manganese, the proportions being four pounds of the silica to three pounds of the oxide. I add to the mixture enough clay-water, or tar, if preferred, or other binding material, to make a mass of the desired consistency. The mass should be ground or worked up sufficiently so as to be uniform in its composition throughout. If the converter is lined with brick or other acid material in the usual way, I spread the mixture over the lining to produce an interior lining or coating thereon about two to four inches in thickness, covering the whole interior of the converter. The mixture may be rammed or otherwise forced into place on the brick or other lining or directly against the shell of the converter. When the charge is poured into the converter and the blow is commenced, the mixture I have described will undergo a chemical change, the silica and the oxide of manganese becoming converted into silicate of manganese, so that the lining will consist, substantially, of silicate of manganese. This is a stable and refractory compound, which, I have demonstrated in practice, reacts so little upon the slag formed during the blow as to leave the slag sufficiently basic to remove, substantially, all the carbon from the charge, so that if ferro-manganese is added, as usual, after the blow the resultant steel will contain but a trace more carbon than was contained in the ferro-manganese which was introduced. The silicon will substantially all be removed, but no phosphorous.

The lining which constitutes my invention is not a basic lining. It is an acid lining, but, if the expression may be used, of about the same degree of basicity as the slag formed at the end of the blow when the charge of pig-iron is low in silicon. There is therefore practically very little reaction during the blow between the lining and the slag if a pig-iron is used for the charge which is low in silicon. I find that a pig-iron which contains from one to 1.30 per cent. of silicon and about .3 per cent. of manganese is most suitable for the charge. When the lining is once formed as above described, the converter can be continuously used in successive blows, as converters with the ordinary acid linings are used. I have used it commercially in the production of low steel for wire from charges of pig-iron low in silicon and manganese and with remarkably-advantageous results.

I do not limit my invention to the method of forming the lining herein described or to the proportions of silica and oxide of manganese set forth, as silicious sand, metallic manganese, or ores of manganese can be compounded and made into a lining, which on being sufficiently heated will be converted into silicate of manganese. Silicate of manganese may be pulverized, mixed with a suitable binding material, and applied as a lining.

While I have above set forth that the lining used by me reacts so little upon the slag as to leave the latter sufficiently basic to remove, substantially, all of the carbon from the charge before the ferro-manganese is added, I do not desire to be understood by this to mean that the slag is a basic one. It is acid, the degree of its acidity being substantially the same as that of the lining, but has also basicity enough to best fit it for the most complete removal of the carbon.

Having thus described my invention, what I claim is—

1. In a converter, a lining consisting, substantially, of silicate of manganese.

2. The method of lining converters, which consists in coating the interior of the converter before use with a mixture consisting, essentially, of silica and manganese or such compounds of those substances as will produce silicate of manganese when heated and a suitable binding material, and then subjecting the coating to the action of heat, substantially as and for the purpose set forth.

In testimony that I claim the foregoing I have hereunto set my hand this 30th day of April, 1891.

CARL WILHELM BILDT.

Witnesses:
FREDERIC H. VIAUX,
WILLIAM A. SARGENT.